United States Patent
Kemmer et al.

(10) Patent No.: US 9,859,578 B2
(45) Date of Patent: Jan. 2, 2018

(54) FUEL CELL ASSEMBLY AND METHOD FOR OPERATING A FUEL CELL ASSEMBLY

(71) Applicant: Robert Bosch GmbH, Stuttgart (DE)

(72) Inventors: Helerson Kemmer, Vaihingen (DE); Mark Hellmann, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 335 days.

(21) Appl. No.: 14/488,021

(22) Filed: Sep. 16, 2014

(65) Prior Publication Data

US 2015/0079490 A1 Mar. 19, 2015

(30) Foreign Application Priority Data

Sep. 16, 2013 (DE) .................. 10 2013 218 470

(51) Int. Cl.
| | | |
|---|---|---|
| H01M 8/04 | (2016.01) | |
| H01M 8/10 | (2016.01) | |
| H01M 8/04291 | (2016.01) | |
| H01M 8/04007 | (2016.01) | |
| H01M 8/0432 | (2016.01) | |
| H01M 8/04701 | (2016.01) | |
| H01M 8/04828 | (2016.01) | |
| H01M 8/1018 | (2016.01) | |
| H01M 8/04119 | (2016.01) | |

(52) U.S. Cl.
CPC ... *H01M 8/04291* (2013.01); *H01M 8/04067* (2013.01); *H01M 8/04126* (2013.01); *H01M 8/04335* (2013.01); *H01M 8/04358* (2013.01); *H01M 8/04701* (2013.01); *H01M 8/04835* (2013.01); *H01M 8/1018* (2013.01); *H01M 2008/1095* (2013.01)

(58) Field of Classification Search
CPC ...... H01M 8/04; H01M 8/10; H01M 8/04067; H01M 8/04126; H01M 8/04335; H01M 8/04358; H01M 8/04701; H01M 8/04835; H01M 8/1018
See application file for complete search history.

(56) References Cited

U.S. PATENT DOCUMENTS

2005/0077364 A1 4/2005 Hwang
2006/0263651 A1 11/2006 Fagley et al.

*Primary Examiner* — Jonathan G Leong
*Assistant Examiner* — Seenam Agbetiafan
(74) *Attorney, Agent, or Firm* — Michael Best & Friedrich LLP

(57) ABSTRACT

A fuel cell assembly (1), having at least one fuel cell (10) with a cathode (11) and an anode, the cathode (11) and the anode each having a fluid inlet (12) and a fluid outlet (13), a cooling device (14) for cooling at least the cathode (11) of the fuel cell (10) by means of a coolant, and a device (15) for influencing the moisture content of at least one cathode fluid.

19 Claims, 3 Drawing Sheets

FUEL CELL ASSEMBLY AND METHOD FOR OPERATING A FUEL CELL ASSEMBLY

BACKGROUND OF THE INVENTION

The present invention relates to a fuel cell assembly having at least one fuel cell with a cathode and an anode, and to a method for operating a fuel cell assembly.

Fuel cell assemblies having fuel cells count as the drive of the future on account of the fact that they emit substantially only pure water as waste product. For the proper and optimal operation of such a fuel cell assembly, the water balance and in particular the closed-loop control of the moisture within the fuel cell of the fuel cell assembly are important factors. For instance, in the event of inadequate moistening, the efficiency of such a fuel cell assembly can be reduced considerably, which can be associated with a poorer power yield and a high production of waste heat from the fuel cell assembly. In the worst case, in particular in the event of too low a moisture content, damage to the fuel cell of the fuel cell assembly cannot be ruled out either.

For this reason, it is necessary to monitor the moisture content of at least one fuel cell fluid and, if appropriate, to influence the same. Here, for example from DE 103 61 672 A1, it is known to use moisture sensors which monitor the moisture content of the fuel cell fluids, in this case hydrogen and air. The disadvantage with such moisture sensors is, however, that these moisture sensors are very inaccurate, in particular under saturated measuring conditions, i.e. with moisture contents of the fluid of about 100%. In the presence of liquid water in the fluid stream it is possible, for example, for droplets to occur, which are able to impair such a moisture sensor negatively over a not inconsiderable time period in such a way that said sensor is not able to supply any usable signal. In this regard, it is alternatively known from DE 10 2006 022 864 A1 to monitor the temperature variation of a coolant in a coolant flow path along a fuel cell and in this way to draw conclusions about a desired moisture content in the fuel cell and, if appropriate, to adjust the same. However, this assumes that the same temperature distribution prevails in the fuel cell as in the coolant. However, this cannot be ensured at every time during the operation of a fuel cell assembly, which means that this control method is susceptible to faults and is inaccurate.

SUMMARY OF THE INVENTION

It is therefore the object of the invention to eliminate the previously described disadvantages of known fuel cell assemblies, at least to some extent. In particular, it is an object of the invention to provide a fuel cell assembly and a method for operating a fuel cell assembly which, in a simple and economical way, permit the operation of a fuel cell assembly with an ideal moisture content of a fuel cell fluid, wherein the sensors used for the control are in particular configured as simply and robustly as possible.

The above object is achieved by a fuel cell assembly according to the invention and by a method for operating a fuel cell assembly according to the invention. In this case, features and details which are described in connection with the fuel cell assembly according to the invention of course also apply in connection with the method according to the invention for operating a fuel cell assembly and respectively vice versa, so that, with respect to the disclosure relating to the individual inventive aspects, reference is made and can be made.

In a first aspect of the invention, the object is achieved by a fuel cell assembly, having at least one fuel cell with a cathode and an anode, the cathode and the anode each having a fluid inlet and a fluid outlet, a cooling device for cooling at least the cathode of the fuel cell by means of a coolant, and a device for influencing the moisture content of at least one cathode fluid. In particular, a fuel cell assembly according to the invention is characterized in that a first temperature sensor for measuring the temperature of the coolant close to the fluid outlet from the cathode of the fuel cell, and a second temperature sensor for measuring the temperature of the cathode fluid at or at least close to the fluid outlet from the cathode of the fuel cell are provided, and in that the device is configured to influence the moisture content at least of the cathode fluid on the basis of the temperature measurements.

A fuel cell assembly according to the invention can have in this case one fuel cell or preferably also multiple fuel cells. The fuel cells can be arranged in a so-called stack, a separate cooling device being provided for each individual fuel cell. Of course, a common cooling device for the individual fuel cells is also conceivable. In order to adjust the moisture content for each of the fuel cells for ideal operation of the respective fuel cell, each fuel cell can be provided individually with a temperature sensor for measuring the temperature of the cathode fluid at or at least close to the fluid outlet from the respective cathode of the fluid cell. The same is also true of the second temperature sensor, which for each individual fuel cell can be arranged on the cooling device belonging thereto, close to the fluid outlet from the cathode of the respective fuel cell. Of course, in particular in the case of a common cooling device, it is also possible to provide only a single second temperature sensor.

The moisture content of the cathode fluid, which in particular is a gas, preferably air, depends in particular on the temperature of the cathode fluid and therefore the temperature of the fuel cell. The temperature of the fuel cell likewise depends on the temperature of the coolant, since waste heat from the fuel cell is to be transported away from the respective fuel cell by the coolant of the cooling device. The two temperatures together permit a determination of the moisture content of the cathode fluid; in particular a change in the two temperatures, absolutely or relative to each other, permits conclusions to be drawn about a change in the moisture content of the cathode fluid. Temperature changes of this type can occur in particular in the event of a load change, in which, for example, the electrical output that is taken from the fuel cell assembly is increased or reduced. This can result in an elevated temperature of the fuel cell assembly, which means that the moisture content of the cathode fluid can be affected. However, a constant moisture content of the cathode fluid is necessary in order to ensure a constant power yield from the fuel cell assembly. The fact that the device for influencing the moisture content of the cathode fluid is configured to the effect that it is able to influence the moisture content at least of the cathode fluid exclusively on the basis of the temperature measurements means that said constant moisture content of the cathode fluid can be ensured. In this way, an operation with high power yield of the fuel cell assembly can be ensured, in particular even during load changes.

In particular, only temperature sensors are used as sensors in a fuel cell assembly according to the invention. As opposed to moisture sensors, which exhibit a high susceptibility to faults at high moisture contents close to 100% moisture, these temperature sensors are considerably less susceptible to faults and robust. Furthermore, in particular for the use of a fuel cell assembly according to the invention in a vehicle, such temperature sensors are already known and present, as opposed to moisture sensors. Labor-intensive and costly new development of sensors can thus be dispensed with. The use of temperature sensors thus constitutes a particularly simple and economic way of providing a device for influencing the moisture content of at least one cathode fluid a data basis.

Preferably, in a fuel cell assembly according to the invention, provision can be made for the at least one fuel cell to be operable with pure hydrogen as a fuel fluid and/or to be configured as a polymer-electrolyte-membrane fuel cell (PEM-FC). A fuel cell of this type emits only pure water as waste product. On account of this quasi emission-free operating mode, such a fuel cell constitutes a very environmentally friendly energy source. Furthermore, by using a fuel cell of this type as compared with conventional internal combustion engines, a considerably higher efficiency can be achieved.

Furthermore, in a fuel cell assembly according to the invention, provision can be made for the device to be configured to adapt a stoichiometry and/or to adapt an operating temperature of the fuel cell assembly, and/or for the device to be a moistener for moistening a cathode fluid, arranged in the fluid inlet to the cathode or in the cathode. The moisture content of the cathode fluid depends in particular on the temperature and the stoichiometry of the cathode fluid. Thus, for example, an increase in the temperature of the fuel cell in relation to the temperature of the coolant can lead to a lowering of the moisture content in the cathode fluid. In addition, an increase in the air stoichiometry, that is to say the excess of air, can likewise lead to a lowering of the moisture content under constant temperature conditions. The fact that the device is configured to adapt a stoichiometry and/or to adapt an operating temperature of the fuel cell assembly thus means that the moisture content of the cathode fluid can be influenced directly. The device can preferably be a moistener for moistening a cathode fluid. By means of such a moistener, it is possible to influence the moisture content of the cathode fluid directly. Here, the moistener can be arranged in the fluid inlet of the fuel cell. Direct integration of the moistener in the cathode of the fuel cell is particularly preferred. As a result of this great bandwidth of possibilities of configuring the device for influencing the moisture content at least of the cathode fluid it is possible to set a fuel cell assembly according to the invention to many possible conditions in a design.

According to a preferred further development of a fuel cell assembly according to the invention, provision can be made for the moistener to be an internal moistener arranged in the cathode. An internal moistener according to the invention is a moistener of which the moistening principle is based on internal moistening. Furthermore, an internal moistener is a particularly simply configured moistener and assumes a high cathode outlet moisture content. In the fuel cell, moisture or water is automatically produced as a waste product during the operation of the fuel cell. Here, the moisture concentration in the fuel cell increases along the flow direction of the cathode fluid. The most moisture is therefore present at the cathode outlet. Dry cathode fluid which flows into the cathode is automatically moistened by this moisture. An internal moistener integrated into the cathode thus constitutes a particularly space-saving and also straightforward way of devising a device for influencing the moisture content, at least of the cathode fluid.

Furthermore, in a fuel cell assembly according to the invention, provision can be made for the device to have an evaluation unit, wherein the evaluation unit is designed to compare the measured temperatures with at least one limiting value, and for the device to be configured to influence the moisture content at least of the cathode fluid on the basis of a result of the comparison. Here, each of the measured temperatures can be compared with a dedicated limiting value. An evaluation unit of this type can in particular also have a programmable microcontroller. Of course, an implementation of an evaluation unit in analog electronics is also conceivable. As a result of the comparison with a limiting value, which in particular can already be determined in advance by means of trials, optimum setting of the operation of the fuel cell assembly is possible.

According to a preferred further development of a fuel cell assembly according to the invention, provision can be made for the evaluation unit to be designed to determine a difference of the measured temperatures and to compare the difference determined with at least one limiting value. Here, the temperature difference permits conclusions to be drawn about a difference in temperature between the coolant and the cathode fluid at the cathode outlet. If, for example, an internal moistener is used in the cathode, then the moisture content of the cathode fluid is realized by evaporating the liquid water from the moistener. However, this evaporation extracts heat from the cathode fluid, which is reflected in different temperatures of the coolant and of the cathode fluid at the cathode outlet. A high difference permits conclusions to be drawn, for example, about a high evaporation rate, from which in turn a reduced moisture content can be inferred. The determination of the difference in the temperatures and the comparison of the difference determined with at least one limiting value represents a particularly simple way of supplying the device for influencing the moisture content with output data, since in particular only one parameter is monitored.

Furthermore, in a fuel cell assembly according to the invention, provision can be made for the cathode fluid and the coolant at or at least close to the fluid outlet from the cathode of the at least one fuel cell to have substantially the same flow direction. The cathode of the fuel cell and the cooling device therefore in principle form a heat exchanger, which equalizes the temperatures of cathode fluid and air. In the case of a high moisture content of the cathode fluid, only little water evaporates within the cathode. Therefore, only little heat is extracted from the cathode fluid by the evaporation, which means a low difference in the temperatures of the coolant and the cathode fluid at the outlet from the fuel cell occurs. In the case of a low moisture content of the cathode fluid and a high evaporation rate associated therewith, the equalization of the temperatures of the coolant and of the cathode fluid is made more difficult. As a result of the high evaporation rate, heat is extracted from the cathode fluid. The result is therefore a high difference in the measured temperatures of the cathode fluid and the coolant. As a result of the same flow direction of the coolant and the cathode fluid, it is possible to ensure that, at the location of the temperature measurement, good heat exchange has taken place between the current and the cathode fluid. As a result, by using the difference of the two temperatures, conclusions can be drawn particularly reliably and accurately about the moisture content of the cathode fluid. This is advantageous in particular when a constant inlet temperature of the coolant cannot be ensured.

According to an alternative configuration of a fuel cell assembly according to the invention, provision can be made for the cathode fluid and the coolant at or at least close to the fluid outlet from the cathode of the at least one fuel cell to have substantially opposite flow directions. This configuration is advantageous in particular when the coolant for the cooling device can be provided with a substantially constant inlet temperature. In this case, of the two measured temperatures, substantially only the temperature of the cathode fluid changes, from which, as already explained above, conclusions can be drawn about the moisture content of the cathode fluid.

As a result of the possibility of implementing a fuel cell assembly according to the invention with both flow directions, the result is in particular no restrictions in the planning and design of the fuel cell assembly according to the invention in relation to the relative flow direction of cathode fluid and coolant. As a result, the area of use of a fuel cell assembly according to the invention can be widened.

In a second aspect of the invention, the object is achieved by a method for operating a fuel cell assembly, the fuel cell assembly having at least one fuel cell with a cathode and an anode, the cathode and the anode each having a fluid inlet and a fluid outlet, a cooling device for cooling at least the cathode of the fuel cell by means of a coolant, and a device for influencing the moisture content at least of a cathode gas. In particular, a method according to the invention for operating a fuel cell assembly is characterized in that a temperature of the coolant close to the fluid outlet from the cathode of the fuel cell and a temperature of the cathode fluid at or at least close to the fluid outlet from the cathode of the at least one fuel cell are measured, and in that, by means of the device, the moisture content at least of the cathode fluid is influenced on the basis of the temperature measurements.

By means of a method according to the invention for operating a fuel cell assembly, it is possible to influence the moisture content at least of the cathode fluid on the basis only of temperature measurements. In particular, open-loop control and/or closed-loop control of the moisture content of the cathode fluid are also possible as a result. A particular advantage of a method according to the invention is that it is possible to dispense with the moisture content measurements, which are considerably less robust and, moreover, more susceptible to faults, because of the sensors used. A method according to the invention for operating a fuel cell assembly thus constitutes a method for operating a fuel cell assembly that is particularly simple, less susceptible to faults and robust. In particular for fuel cell assemblies which are operated in vehicles, a method according to the invention is also a particularly advantageous method, since the sensors used for the temperature measurement are already available. Complicated and costly new developments can thus be avoided.

Particularly preferably, in a method according to the invention for operating a fuel cell assembly, provision can be made for a fuel cell assembly according to the first aspect of the invention to be operated by means of the method. All the advantages which have been described in relation to a fuel cell assembly according to the first aspect of the invention thus of course also result for a method according to the invention by means of which a fuel cell assembly of this type is operated.

BRIEF DESCRIPTION OF THE DRAWINGS

The fuel cell assembly according to the invention and the developments thereof, as well as their advantages, and the method according to the invention and the developments thereof, as well as their advantages, will be explained in more detail below by using drawings, in which, in each case schematically.

Elements having the same function and mode of action are each provided with the same designations in FIGS. 1, 2, 3a, 3b and 4.

DETAILED DESCRIPTION

Figure 1:
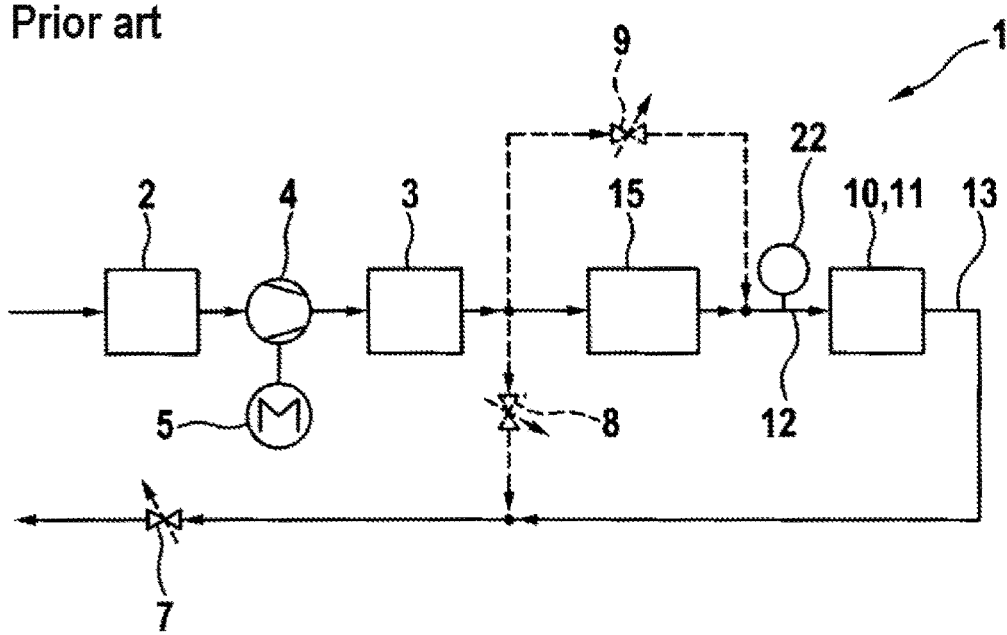
FIG. 1 shows a fuel cell assembly according to the prior art.

FIG. 1 shows a typical cathode fluid system of a fuel cell 10 of a fuel cell assembly 1 according to the prior art. The anode part of the fuel cell arrangement 1 is not included in the illustration. The cathode fluid, air in this case, is cleaned by an air filter 2 before entering the cathode 11. The pressure of the air is then increased by a compressor 4 driven by a compressor motor 5. By means of a heat exchanger 3 and a device for influencing the moisture content 15, the cathode fluid is then conditioned to the effect that it has the necessary inlet conditions for the entry into the cathode 11 through the fluid inlet 12. Unused cathode fluid is led out of the fuel cell 10 again together with reaction products, in particular water, that have arisen in the fuel cell 10. The inlet moisture content of the cathode fluid is set by means of external closed-loop control, here a moisture sensor 22 for measuring the moisture content of the cathode fluid being provided. By using a throttle flap 7, the system pressure can be set as a function of the mass flow. If, for example, the compressor 4 is implemented as a turbo machine, such as a radial compressor, a bypass with throttle flap 8 can also be provided for reasons of component protection. The device for influencing the moisture content 15 can also likewise have a moistener bypass with a throttle flap 9. In the shown fuel cell assembly 1 according to the prior art, the moisture content of the cathode fluid is thus measured via a moisture sensor 22. However, these moisture sensors 22 are less robust and in particular susceptible to faults, in particular in the presence of liquid water. The reason for this is, in particular, that a moisture sensor 22 which is hit by a water droplet is not able to supply any data over a non-negligible time.

Figure 2:
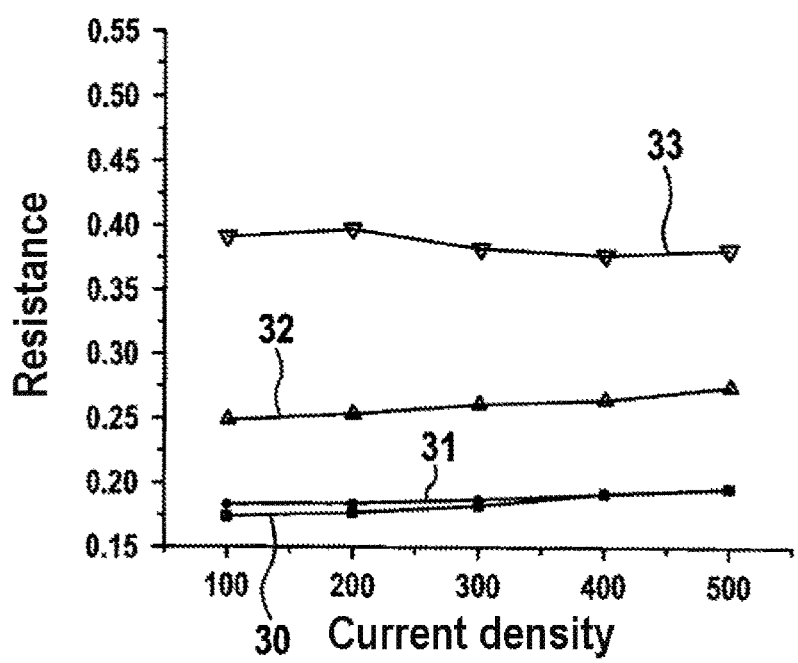
FIG. 2 shows resistance measurements on a fuel cell assembly.

In FIG. 2, series of measurements of the resistance of a fuel cell 10 are plotted against the current density for various cathode moisture contents. Here, in particular series of measurements for cathode moisture content 100% 30, cathode moisture content 70% 31, cathode moisture content 50% 32 and cathode moisture content 33% 33 have been recorded. It can clearly be seen that, as the cathode moisture content increases, the resistance of the fuel cell 10 decreases. A low resistance of the fuel cell 10 corresponds to a high efficiency of the fuel cell 10, since losses within the fuel cell 10 are minimized. Furthermore, a high resistance, which, as can be seen in FIG. 2, corresponds to a low cathode moisture content, is associated with a high development of heat of the fuel cell during operation, which can possibly lead to damage to the fuel cell 10. This makes it clear that control and in particular closed-loop control of the moisture content at least of the cathode fluid has a great influence on the power output and the service life of a fuel cell 10 and an overall fuel cell assembly 1.

Figure 3A:
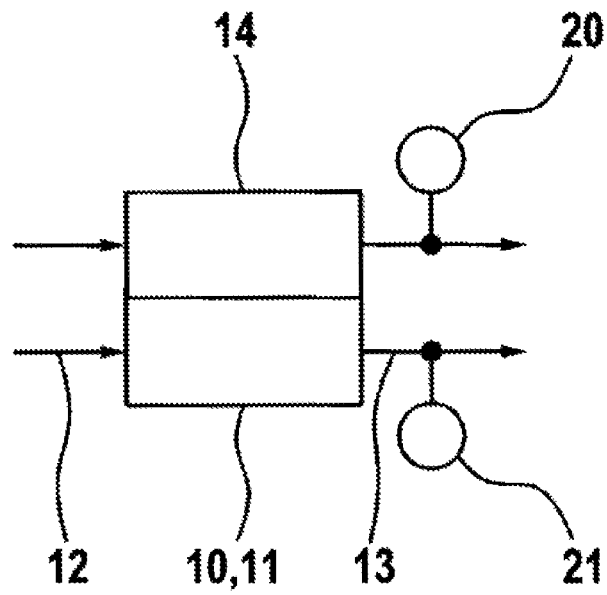
FIG. 3a shows a first configuration of part of a fuel cell assembly according to the invention.
Figure 3B:
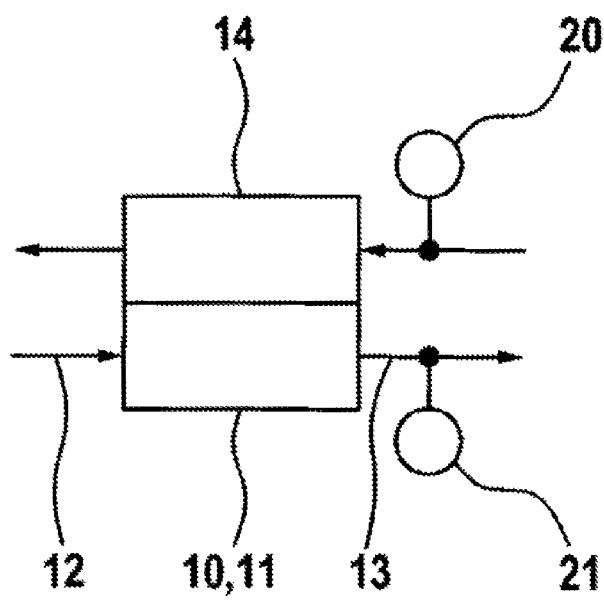
FIG. 3b shows a second configuration of part of a fuel cell assembly according to the invention.

FIGS. 3a and 3b show two configurations of the cathode 11 with arranged cooling device 14 of a fuel cell 10 of a fuel cell assembly 1 according to the invention. The two configurations differ in the fact that in FIG. 3a the flow directions of the cathode gas through the cathode 11 and of the coolant through the cooling device 14 are the same, in FIG. 3b the flow directions are opposite. The factor common to both configurations is that a first temperature sensor 20 and a second temperature sensor 21 are respectively arranged at or close to the fluid outlet 13 from the cathode 11 of the fuel cell 10. As a result, in both configurations of a fuel cell assembly 1 according to the invention, it is possible to determine temperature differences between the coolant in the cooling device 14 and the cathode fluid in the cathode 11. These temperature differences, in particular a difference of the temperatures, can be used to draw conclusions about the moisture content of the cathode fluid in the cathode 11, in particular at the cathode outlet. Moreover, the temperatures, in particular the differential temperatures, can be used to control a device 15 for influencing the moisture content at least of the cathode fluid under open-loop and/or closed-loop control, to the effect that the cathode fluid has a moisture content that is ideal for the operation of the fuel cell 10.

Figure 4:
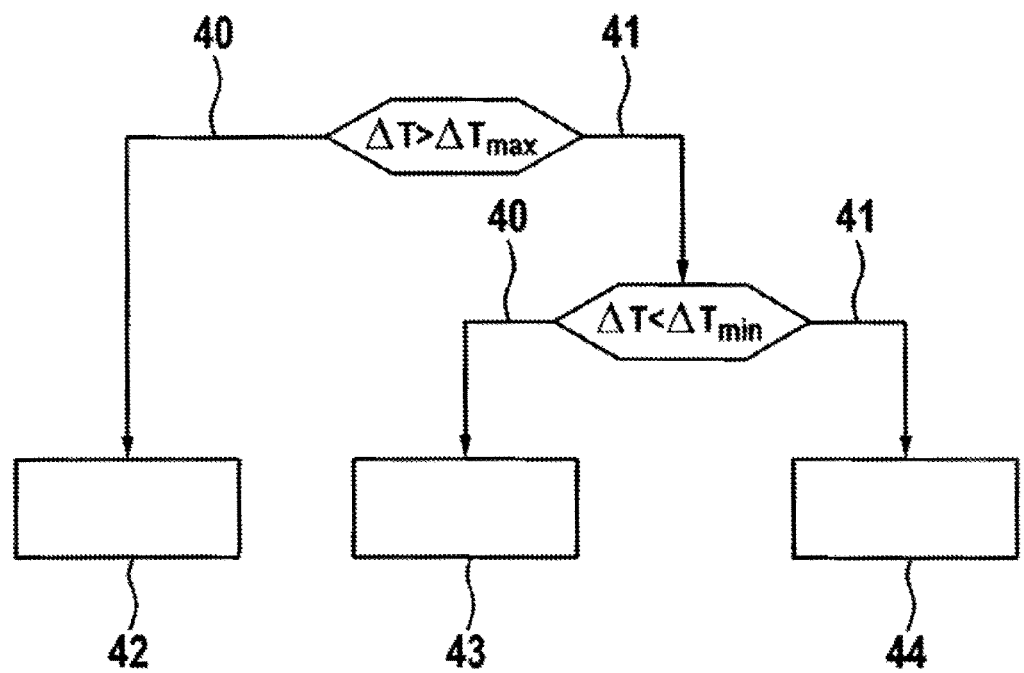
FIG. 4 shows closed-loop moisture control of a fuel cell assembly according to the invention.

FIG. 4 shows a schematic decision diagram for the control of the moisture content in a device 15 for influencing the moisture content in a cathode gas. A decision diagram of this type can be processed in particular in an evaluation unit of a device 15. Here, $\Delta T$ represents the difference of the temperatures of the coolant, measured by the first temperature sensor 20, and of the cathode fluid, measured by the second temperature sensor 21. $\Delta T_{max}$ and $\Delta T_{min}$ are respectively limiting values which can be compared with the measured temperature difference $\Delta T$ in an evaluation unit. If, in a first step, it is established that the measured temperature difference $\Delta T$ is greater than a maximum limiting value $\Delta T_{max}$ 40, then it is assumed that the moisture content in the cathode fluid is not sufficiently high. The reason for this is that, from a large temperature difference, it is possible to conclude that there is a high evaporation rate within the cathode 11, which in particular leads to a low moisture content. The device 15 for influencing the moisture content is then controlled under open-loop or closed-loop control to the effect that the moisture content of the cathode gas is increased thereby, 42. If the measured temperature difference $\Delta T$ is not greater than the upper limiting value $\Delta T_{max}$, 41, then in a next step a comparison is made as to whether the measured temperature difference $\Delta T$ is smaller than a minimum limiting value $\Delta T_{min}$. If this is the case, 40, then the device 15 for influencing the moisture content is controlled under open-loop or closed-loop control to the effect that the moisture content of the cathode fluid is reduced thereby, 43. If the result of the comparison is negative, 41, and thus the measured temperature difference $\Delta T$ is arranged between the two limiting values $\Delta T_{max}$ and $\Delta T_{min}$, then it is assumed that the moisture content of the cathode fluid lies in a range in which an ideal or substantially ideal operation of the fuel cell assembly 1 according to the invention is possible. In this case, no closed-loop control or activation is sent to the device 15 for influencing the moisture content, and the existing moisture content in the cathode fluid is maintained, 44. In this way, it is possible, merely by means of two temperature measurements by the first temperature sensor 20 and the second temperature sensor 21, to draw conclusions about the moisture content of the cathode fluid. It is thus possible to dispense with a direct measurement of the moisture content of the cathode fluid by means of a moisture sensor 22 that is susceptible to faults.

What is claimed is:

1. A fuel cell assembly (1), comprising at least one fuel cell (10) with a cathode (11) and an anode, the cathode (11) and the anode each having a fluid inlet (12) and a fluid outlet (13), a cooling device (14) for cooling at least the cathode (11) of the fuel cell (10) by means of a coolant, and a device (15) for influencing the moisture content of at least one cathode fluid, also comprising a first temperature sensor (20) for measuring the temperature of the coolant close to the fluid outlet (13) from the cathode (11) of the fuel cell (10), and a second temperature sensor (21) for measuring the temperature of the cathode fluid at or at least close to the fluid outlet (13) from the cathode (11) of the fuel cell (10), and wherein the device (15) is configured to influence the moisture content at least of the cathode fluid on the basis of the temperature of the coolant measured by the first temperature sensor (20) and the temperature of the cathode fluid measured by the second temperature sensor (21), wherein the device (15) has an evaluation unit (15) configured to determine a difference of the temperature of the coolant measured by the first temperature sensor (20) and the temperature of the cathode fluid measured by the second temperature sensor (21).

2. The fuel cell assembly (1) according to claim 1, characterized in that the at least one fuel cell (10) is configured to be operated with pure hydrogen as a fuel fluid.

3. The fuel cell assembly (1) according to claim 2, characterized in that the at least one fuel cell (10) is configured as a polymer-electrolyte-membrane fuel cell (PEM-FC).

4. The fuel cell assembly (1) according to claim 1, characterized in that the at least one fuel cell (10) is configured as a polymer-electrolyte-membrane fuel cell (PEM-FC).

5. The fuel cell assembly (1) according to claim 1, characterized in that the device (15) is configured to adapt a stoichiometry and/or to adapt an operating temperature of the fuel cell assembly (1).

6. The fuel cell assembly (1) according to claim 5, characterized in that the device (15) is a moistener for moistening a cathode fluid, arranged in the fluid inlet (12) to the cathode (11) or in the cathode (11).

7. The fuel cell assembly (1) according to claim 1, characterized in that the device (15) is a moistener for moistening a cathode fluid, arranged in the fluid inlet (12) to the cathode (11) or in the cathode (11).

8. The fuel cell assembly (1) according to claim 7, characterized in that the moistener is an internal moistener arranged in the cathode.

9. A fuel cell assembly (1), comprising at least one fuel cell (10) with a cathode (11) and an anode, the cathode (11) and the anode each having a fluid inlet (12) and a fluid outlet (13), a cooling device (14) for cooling at least the cathode (11) of the fuel cell (10) by means of a coolant, and a device (15) for influencing the moisture content of at least one cathode fluid, also comprising a first temperature sensor (20) for measuring the temperature of the coolant close to the fluid outlet (13) from the cathode (11) of the fuel cell (10), and a second temperature sensor (21) for measuring the temperature of the cathode fluid at or at least close to the fluid outlet (13) from the cathode (11) of the fuel cell (10), and wherein the device (15) is configured to influence the moisture content at least of the cathode fluid on the basis of the temperature of the coolant measured by the first temperature sensor (20) and the temperature of the cathode fluid measured by the second temperature sensor (21), characterized in that the device (15) has an evaluation unit, wherein the evaluation unit is configured to compare the temperature of the coolant measured by the first temperature sensor (20) and the temperature of the cathode fluid measured by the second temperature sensor (21) with at least one limiting value, and the device (15) is configured to influence the moisture content at least of the cathode fluid on the basis of a result of the comparison.

10. The fuel cell assembly (1) according to claim 9, characterized in that the evaluation unit is configured to determine a difference of the temperature of the coolant measured by the first temperature sensor (20) and the temperature of the cathode fluid measured by the second temperature sensor (21) and to compare the difference determined with at least one limiting value.

11. The fuel cell assembly (1) according to claim 1, characterized in that the cathode fluid and the coolant at or at least close to the fluid outlet (13) from the cathode (11) of the at least one fuel cell (10) have substantially the same flow direction.

12. The fuel cell assembly (1) according to claim 1, characterized in that the cathode fluid and the coolant at or at least close to the fluid outlet (13) from the cathode (11) of the at least one fuel cell (10) have substantially opposite flow directions.

13. The fuel cell assembly (1) according to claim 11, wherein the cooling device (14) has a coolant inlet and a coolant outlet, and wherein the first temperature sensor (20) is at or at least close to the coolant outlet.

14. The fuel cell assembly (1) according to claim 12, wherein the cooling device (14) has a coolant inlet and a coolant outlet, and wherein the first temperature sensor (20) is at or at least close to the coolant inlet.

15. A fuel cell assembly (1) comprising:
at least one fuel cell (10) with a cathode (11) and an anode, the cathode (11) and the anode each having a fluid inlet (12) and a fluid outlet (13), a cooling device (14) for cooling at least the cathode (11) of the fuel cell (10) by means of a coolant, and a device (15) for influencing the moisture content of at least one cathode fluid;
a first temperature sensor (20) for measuring the temperature of the coolant close to the fluid outlet (13) from the cathode (11) of the fuel cell (10); and
a second temperature sensor (21) for measuring the temperature of the cathode fluid at or at least close to the fluid outlet (13) from the cathode (11) of the fuel cell (10),
wherein the device (15) is configured to influence the moisture content at least of the cathode fluid on the basis of the temperature of the coolant measured by the first temperature sensor (20) and the temperature of the cathode fluid measured by the second temperature sensor (21),
wherein the device (15) has an evaluation unit configured to compare the temperature of the coolant measured by the first temperature sensor (20) and the temperature of the cathode fluid measured by the second temperature sensor (21) with at least one limiting value, and the device (15) is configured to influence the moisture content at least of the cathode fluid on the basis of a result of the comparison, and
wherein the evaluation unit is configured to determine a difference of the temperature of the coolant measured by the first temperature sensor (20) and the temperature of the cathode fluid measured by the second temperature sensor (21) and to compare the difference determined with at least one limiting value.

16. The fuel cell assembly (15) according to claim 15, wherein the at least one fuel cell (10) is configured to be operated with pure hydrogen as a fuel fluid.

17. The fuel cell assembly (1) according to claim 15, wherein the at least one fuel cell (10) is configured as a polymer-electrolyte-membrane fuel cell (PEM-FC).

18. The fuel cell assembly (1) according to claim 15, wherein the device (15) is a moistener for moistening a cathode fluid, arranged in the fluid inlet (12) to the cathode (11) or in the cathode (11).

19. The fuel cell assembly (1) according to claim 18, wherein the moistener is an internal moistener arranged in the cathode.

* * * * *